(No Model.)
J. HENRIE.
VEHICLE SPRING.
No. 581,285. Patented Apr. 27, 1897.
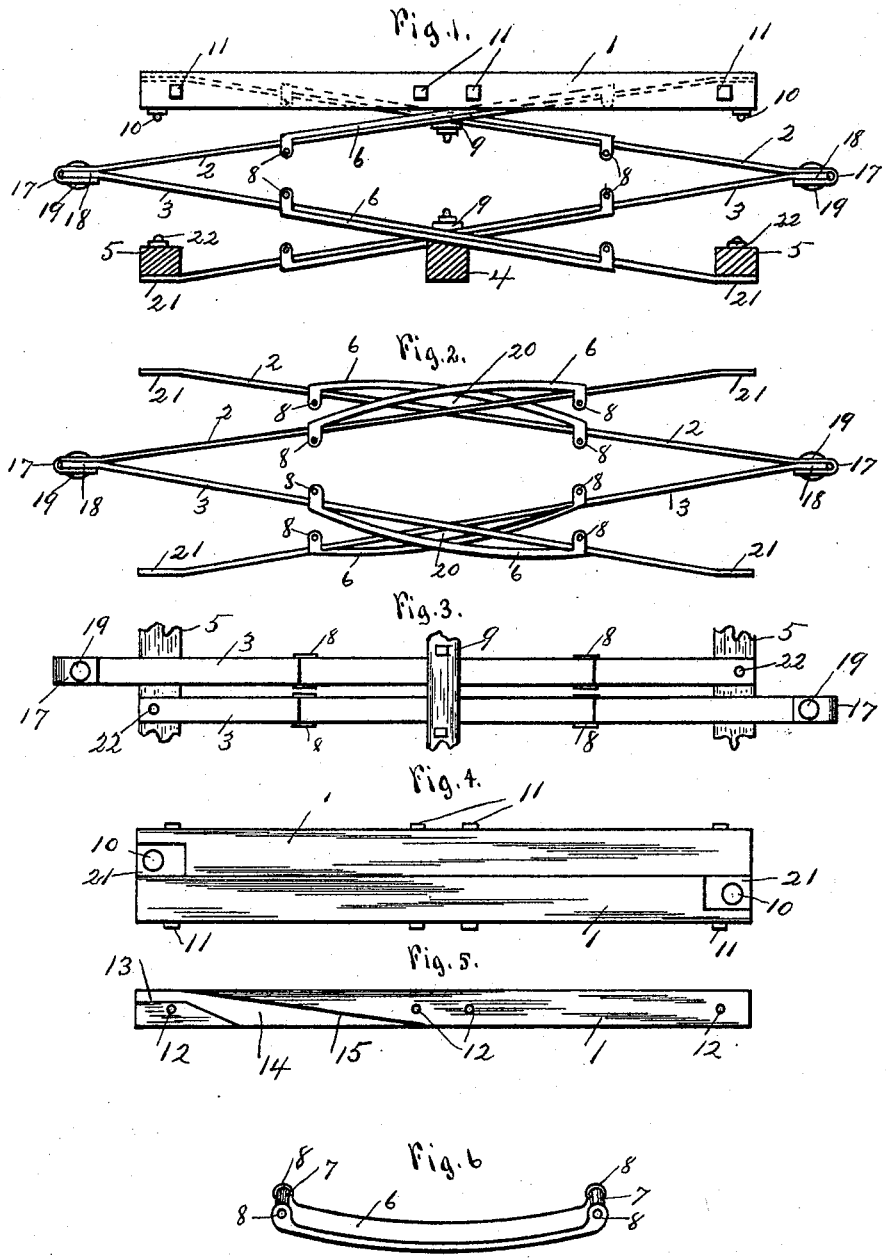
Witnesses
G. E. Martin.
M. S. Hinman
Inventor
Joseph Henrie
By N. B. Hagin atty

UNITED STATES PATENT OFFICE.

JOSEPH HENRIE, OF BENTON, KANSAS.

VEHICLE-SPRING.

SPECIFICATION forming part of Letters Patent No. 581,285, dated April 27, 1897.

Application filed June 23, 1896. Serial No. 596,566. (No model.)

*To all whom it may concern:*

Be it known that I, JOSEPH HENRIE, a citizen of the United States of America, residing at Benton, in the county of Butler and State of Kansas, have invented certain new and useful Improvements in Vehicle-Springs, of which the following is a specification, reference being had therein to the accompanying drawings, and the figures of reference thereon, forming a part of this specification, in which—

Figure 1 is a side view of my improved vehicle-spring attached to the bolster and reaches of a vehicle. Fig. 2 is a side view of the same removed from the bolster and vehicle-reaches. Fig. 3 is a bottom plan of said spring. Fig. 4 is a top plan of said bolster. Fig. 5 is a detail showing an inside edge view of said bolster. Figs. 6 and 7 are details of the spring.

This invention relates to certain improvements in vehicle-springs and the bolster to which the top of said springs are secured, and particularly to my vehicle-spring patented April 18, 1893, No. 495,489.

Referring to the drawings, 1 represents my improved vehicle-bolster.

2 represents the upper leaves of the vehicle-spring. 3 represents the lower leaf of said spring.

4 and 5 represent the center and the two outer reaches of a vehicle.

6 represents supplementary springs held to said springs 2 and 3. Said springs are provided with the lips 8 at the ends and on either side of said springs. 7 represent rollers secured to either end of said spring 6 and are adapted to roll on said springs 2 and 3.

9 represents strips which hold the upper and lower springs to their respective seats and also force the springs 2 and 6 and 3 and 6 together, thus keeping a continuous tension on said springs 6.

The horizontal portions 21 of the springs 2 and 3 are held, respectively, to the bolster 1 and outer reaches 5 by the bolts 10 and 22.

The bolster 1 is made of two pieces held together by the bolts 11, passing through the holes 12.

13 represents a flat seat for the ends 21 of the springs 2.

14 represents a portion cut away from each of the two pieces of said bolster 1 the width of said springs. (See Figs. 4 and 5.) Said cut-away portion is for allowing said springs to freely work.

The springs 6 are heavier and stiffer than the springs 2 and 3, and as they are held together by the strips 9 the springs 2 and 6 are held straight by the surface 15 of the bolster 1, (see Fig. 5,) and the springs 6 and 3 are held straight by the center reach 4.

17 represents one end of the springs 2 bent over to form a loop.

18 represents one end of the springs 3 secured in the loop 17 by the rivets 19, thus forming the two V-shaped springs.

20 represents the natural position of the springs 6 when they are not held straight by the strips 9.

This construction of springs stiffens said springs where it is most needed—viz., along the line of the supplementary spring and especially when they are held by the strips 9. This supplementary spring may be used in connection with an ordinary diamond-shaped spring.

Having thus described my invention, what I claim as new and useful, and desire to secure by Letters Patent, is as follows:

1. In the herein-described vehicle-spring consisting of a supplementary spring of flat spring metal, yieldingly secured to the springs 2 and 3 by the lips 8 and rollers 7 surrounding said springs, said springs 2 and 3 joined at their outer ends, and their opposite ends adapted to be secured to a vehicle bolster and reaches.

2. In combination with a vehicle, a bolster consisting of two pieces permanently secured together by bolts, said pieces having the spring-seat 13 and the mortised portion 14, the V-shaped spring formed of two flat pieces of metal joined at their outer ends in the manner shown, and the supplementary springs 6 having the lips 8 sleeved on said V-shaped spring.

3. In combination with a vehicle, the bolster composed of two separate pieces bolted together, each of said pieces mortised out to receive one end of the spring 2, the V-shaped springs permanently secured together at one end, the supplementary springs provided with the lips and rollers at either end, the springs 9 and the reaches 4 and 5 substantially as shown and described.

JOSEPH HENRIE.

Witnesses:
H. M. DU BOIS,
O. A. KEACH.